United States Patent [19]
Rahn et al.

[11] Patent Number: 5,727,478
[45] Date of Patent: Mar. 17, 1998

[54] POP-UP TABLE ASSEMBLY

[75] Inventors: Brian Rahn, St. Clair Shores; George Corder, Romulus; Walter Kemmer; David Piontek, both of Canton; Brett Schihl, Plymouth, all of Mich.

[73] Assignee: ASC Incorporated, Southgate, Mich.

[21] Appl. No.: 689,965

[22] Filed: Aug. 16, 1996

[51] Int. Cl.⁶ .................................................. A47B 3/00
[52] U.S. Cl. ........................ 108/134; 108/48; 108/284.1
[58] Field of Search .................... 108/134, 35, 42, 108/47, 48; 248/291.1, 284.1, 276.1

[56] References Cited

U.S. PATENT DOCUMENTS

| | | | |
|---|---|---|---|
| 2,356,924 | 8/1944 | Froelich | 248/284.1 X |
| 2,700,835 | 2/1955 | Dyrud | 108/134 |
| 2,743,976 | 5/1956 | Gaston | 108/134 |
| 3,105,448 | 10/1963 | Patrie . | |
| 3,636,892 | 1/1972 | Linton . | |
| 3,866,548 | 2/1975 | Skonieczny . | |
| 4,047,488 | 9/1977 | Gutridge et al. . | |
| 4,068,601 | 1/1978 | Marsh et al. . | |
| 4,136,622 | 1/1979 | Bue et al. | 108/48 |
| 4,480,556 | 11/1984 | Wilson et al. | 108/48 |
| 4,995,681 | 2/1991 | Parnell | 108/48 X |
| 5,069,142 | 12/1991 | Matre . | |
| 5,108,063 | 4/1992 | Koerber, Sr. et al. | 248/284.1 |
| 5,432,963 | 7/1995 | Coral et al. . | |

FOREIGN PATENT DOCUMENTS

| | | | |
|---|---|---|---|
| 1464732 | 11/1966 | France | 108/48 |
| 2736048 | 2/1979 | Germany | 108/48 |
| 3312892 | 3/1984 | Germany . | |
| 647939 | 2/1985 | Germany | 108/134 |

OTHER PUBLICATIONS

Brochure, Peterbilt, "Ultrasleeper", Mar. 1996.
Drawing from Great Britian Patent No. 310,651, issued 1929.

Primary Examiner—Peter M. Cuomo
Assistant Examiner—Hanh V. Tran
Attorney, Agent, or Firm—Harness, Dickey & Pierce, P.L.C.

[57] ABSTRACT

Provided is a table assembly for use in over-the-road trucks. The table assembly includes a table top and a table support linkage assembly having a center support linkage mechanism and a pair of side support linkage mechanisms. The table assembly of the present invention enabling the table top to be positionable between a first elevated position and a second lowered position whereby the table top remains substantially horizontal during the path of travel from the first position to the second position. The table assembly further including a latching mechanism for maintaining table assembly in the first elevated position.

24 Claims, 2 Drawing Sheets

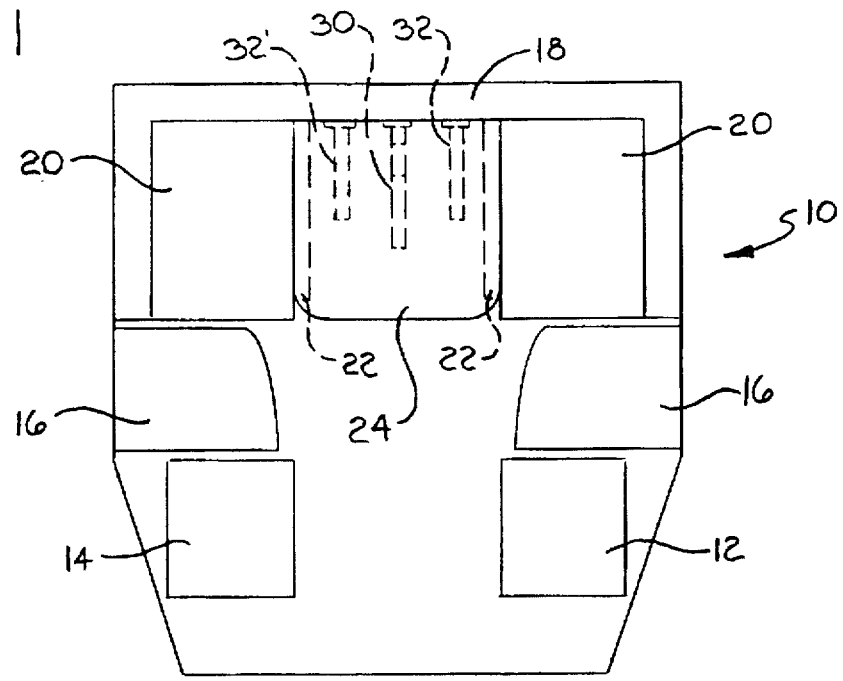
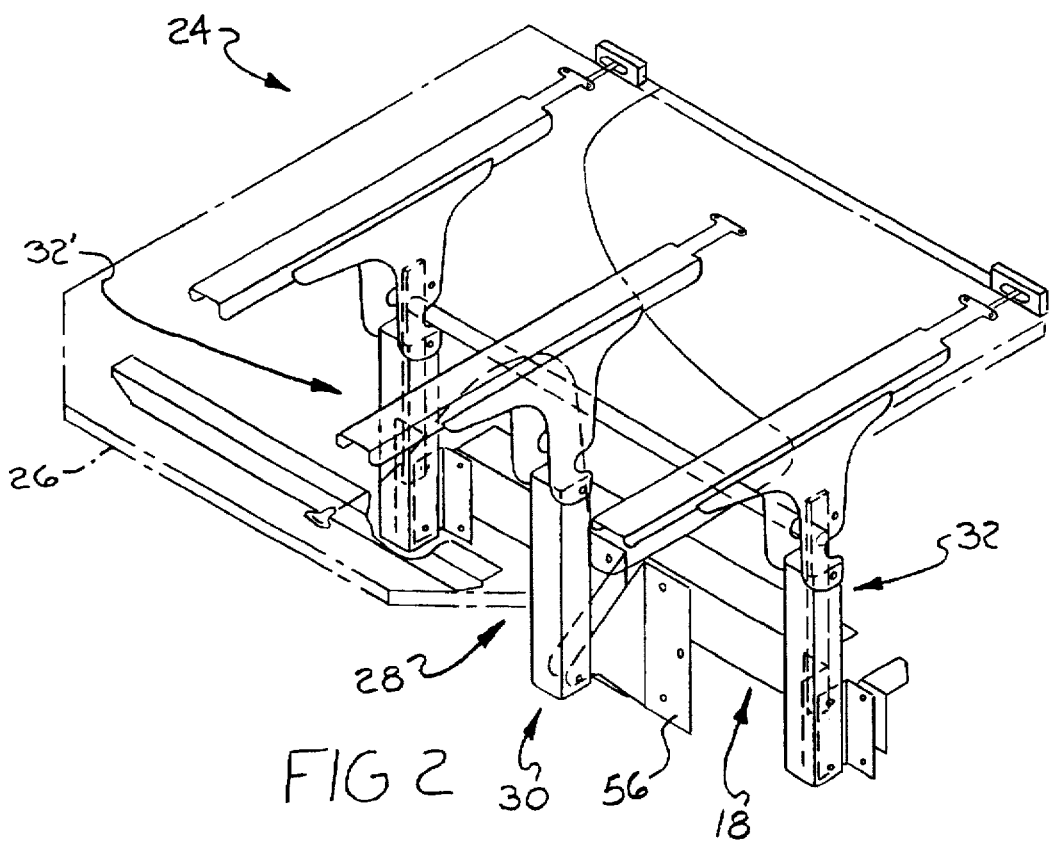

5,727,478

POP-UP TABLE ASSEMBLY

BACKGROUND AND SUMMARY OF THE INVENTION

This invention relates generally to a table assembly positionable between a first elevated position and a second, lowered position and more particularly to a table assembly having a table top operatively coupled to a vertical wall portion by a table support linkage such that the table top remains substantially horizontal during manipulation between the two positions.

Large over-the-road trucks or long-haul tractor trailers have long been designed with extended cab areas which are provided with a variety of comfort features such as beds, cabinets, tables and the like. For example, the vehicle cab is equipped with a bed which provides a sleeping surface for off-duty drivers or passengers of the over-the-road trucks. While it is desirable to provide sleeping accommodations, it is also desirable to maximize the space within the cab interior. Therefore, it is desirable to provide a compact and convenient manner for equipping the vehicle cab with these comfort features, while maximizing the useable space therein for storage and living quarters.

As an example, over-the-road truck cabs are commonly equipped with an elevated sleeping surface or bunk bed which extends from a wall portion of the truck cab and is positionable between a stowed position and a use position. For example, U.S. Pat. No. 5,432,963, which is commonly owned by the assignee of the present invention and which is hereby expressed incorporated by reference, discloses one such truck cab mattress. In this manner, the entire sleeping surface is manipulated between a stowed position and a use position, but does not provide any additional functions when not being used as a bunk bed. Alternately, a sleeping surface can be combined with a seating and table assembly, thereby providing a dual function of a sleeping area and a sitting/eating area within the same general space. However, prior an tables of the latter type often are difficult to manipulate, require assistance in setting up and include support legs which extend between the table top and the floor, thus reducing the leg room beneath the table assembly.

The present invention is directed to a table assembly which is secured to a side wall portion of the vehicle cab and is readily and easily positionable between an elevated first position for providing a table top surface and a second, lowered position for aligning with the adjacent bench seats for providing a flat sleeping surface. The table assembly includes a table top operatively coupled to the vehicle side wall by a table support linkage assembly having a center support linkage and a pair of side support linkages. The kinematics of the table support linkage assembly enables the table top to remain parallel during the entire path of movement from the first elevated position to the second lowered position. A pair of latch mechanisms interdisposed between the side support linkages and the vertical wall of the vehicle cab maintain the table assembly in the first, elevated position and are provided with a release cable mechanism for uncoupling the table assembly from the side wall of the vehicle cab.

Accordingly, it is an object of the present invention to provide a table assembly which is readily positionable between a first elevated position and a second elevated position.

It is another object of the present invention to provide a table top to remain parallel during the path of movement from the first elevated position to the second lowered position.

These and other advantages and features of the present invention will become apparent to those skilled in the art from the following written description and appended claims, taken in conjunction with the accompanying drawings.

BRIEF DESCRIPTION OF THE DRAWINGS

FIG. 1 is a schematic representation of an interior over-the-road truck cab showing the relative location of the various interior components including the table assembly of the present invention;

FIG. 2 is a perspective view showing the table assembly of the present invention in the first elevated position;

DETAILED DESCRIPTION OF THE PREFERRED EMBODIMENT

Figure 3:
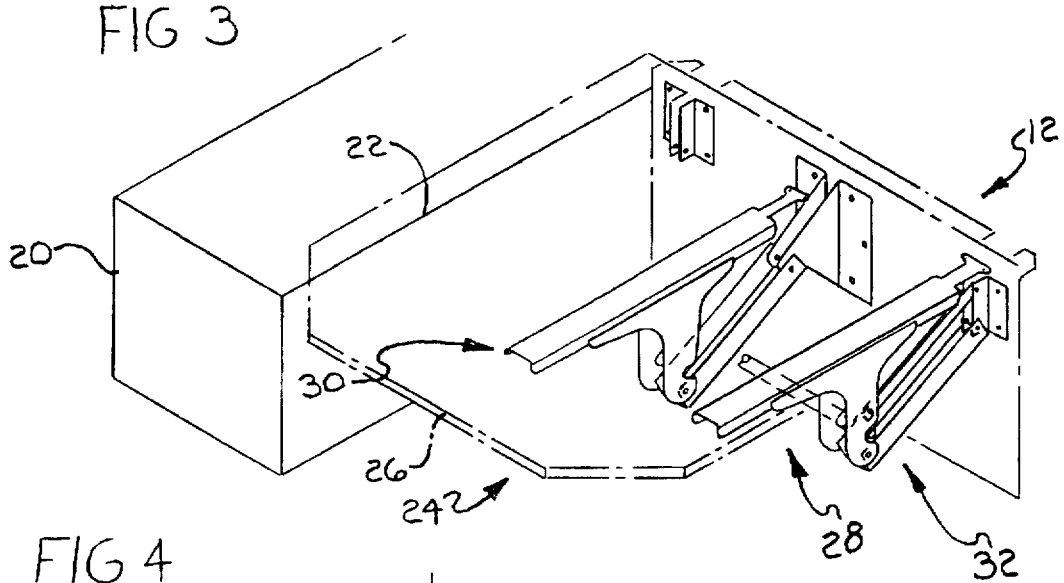
FIG. 3 is a perspective view showing the table assembly of the present invention showed in the second, lowered position.

The present invention provides a table assembly positionable from a first, elevated position to a second, lowered position and is adapted for use in the interior of numerous types of vehicles such as over-the-road trucks, recreational vehicles, marine crafts, railroad cars, air crafts and the like. While the preferred embodiment relates to a positionable table assembly adapted to a cab of an over-the-road truck, one will readily appreciate that the present invention is not so limited in application.

Referring to FIG. 1, a schematic representation of cab 10 of an over-the-road truck having numerous comfort features included therein is illustrated. More specifically, cab 10 includes driver's seat 12 and passenger's seat 14, a pair of cabinet assemblies 16 located behind driver's seat 12 and passenger's seat 14, a rear wall portion 18 of cab 10, bench seats 20 for providing a seating location within the rear portion of cab 10 and having table support flange 22 and table assembly 24.

Referring now to FIGS. 2 and 3, table assembly 24 includes table top 26 having various comfort features such as cup holders formed therein and which is operably coupled to rear wall portion 18 of cab 10 by table support linkage assembly 28 which includes center support linkage 30 and side support linkages 32, 32'. For reasons of clarity, right side support linkage 32' is not illustrated in FIG. 3 but is identical to left side support linkage 32. Torsion bar 34 extends between left and right side support linkage 32, 32'. Referring now to FIG. 2, a pair of latch pins 36, 36' extend rearwardly from side support linkages 32, 32' and engage latch mechanisms 38, 38' for securing table assembly 24 in the first, elevated position. Release cable 40 is operably coupled at a first end to latch mechanisms 38, 38' and operably coupled to release handle 42 at an end opposite thereof. In this manner, latch mechanisms 38, 38' may be operated from in front of table assembly 24. Release cable 40 and release handle 42 are secured to a bottom portion of table top 26 by release handle support bracket 44.

Latch mechanism 38 is designed so as to provide an adequate amount of lateral compliance to accommodate slight side-to-side movement while providing precise vertical location with respect to pin 36 for appropriately positioning table assembly 24 in the first, elevated position. While a variety of latch mechanisms may be readily adapted for use in the present invention, the latch mechanism currently utilized as a hood latch mechanism for the Chevrolet Corvette is presently preferred.

Figure 4:
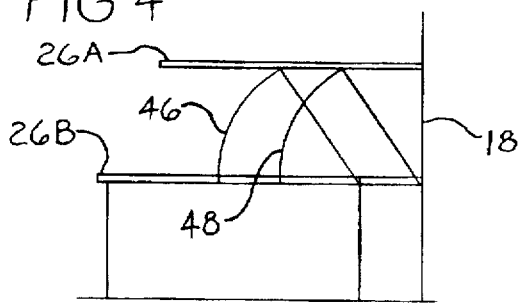
FIG. 4 is a schematic representation of the table assembly of the present invention and further illustrating the path of travel of the table top.

Referring now to FIG. 4, the path of travel of table assembly 24 is illustrated. Table top 26 is illustrated in the first elevated position as 26A and table top 26 is illustrated in the second, lowered position as 26B. More particularly, when table top 26 is manipulated from the first, elevated position to the second, lowered position center support linkage 30 traces an arcuate path designated as reference numeral 46, while side support linkages 32, 32' travel along the arcuate path designated as reference numeral 48. By utilizing a pair of linkage mechanisms which provide a non-coincident center of rotation, table top 26 remains substantially parallel through the path of travel. Furthermore, by utilizing a pair of side support linkages interconnected by a torsion bar and a center support linkage, table top 26 follows the same path of travel during each manipulation from an elevated position to a lowered position and vice versa. In this manner, table support linkage assembly 28 is able to accuratley and repeatedly align with latch mechanism 38 in the first, elevated position and align with seat flange 22 in the second, lowered position.

Figure 5:
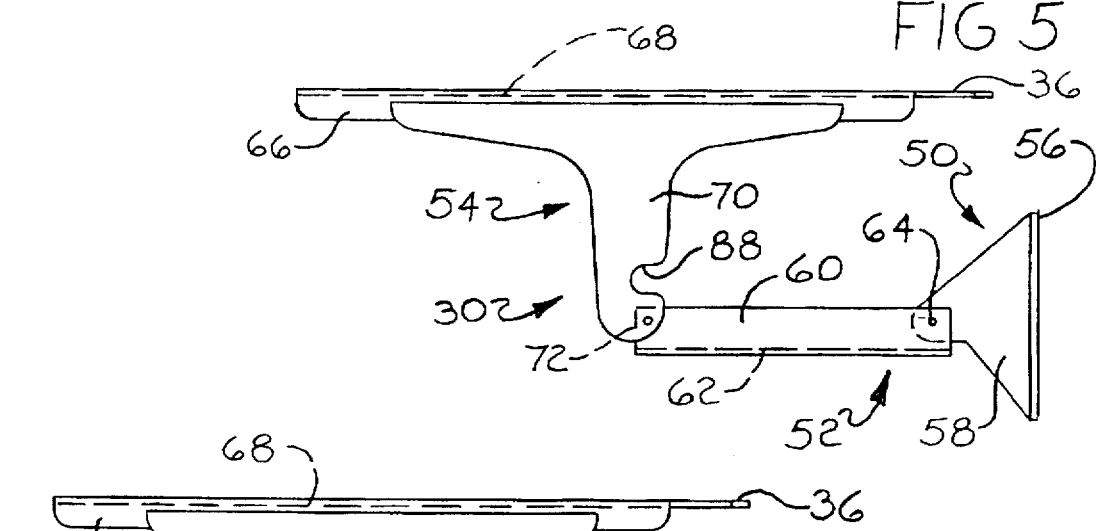
FIG. 5 is a simplified side view of the center support linkage of the present invention.

Referring now to FIGS. 2-3 and 5, center support linkage 30 includes support bracket 50 secured to rear wall portion 18 of vehicle cab 10, connection link 52, and table bracket 54 secured to table top 26 and operably coupled to support bracket 50 by connection link 52. More specifically, support bracket 50 includes plate 56 having a plurality of apertures formed therein for securing support bracket 50 to rear wall portion 18 with appropriate fasteners. A pair of flanges 58 extend forwardly from plate 56. Connection link 52 is generally U-shaped having side wall portions 60 and web 62 defining a channel therebetween. Connection link 52 is pivotally coupled with flange 58 of support bracket 50 at pivot point 64. Table bracket 54 is generally U-shaped and includes a pair of side walls 66 interconnected by web 68. Latch pin 36 is secured to an end portion of web 68 and extends rearwardly therefrom. Flange 70 extends downwardly from side walls 66 at approximately the midpoint of table bracket 54 and is pivotally connected with connection link 52 at pivot 72 opposite pivot 64. Table top 26 is secured to an upper surface of web 68 by any well known manner.

Figure 6:
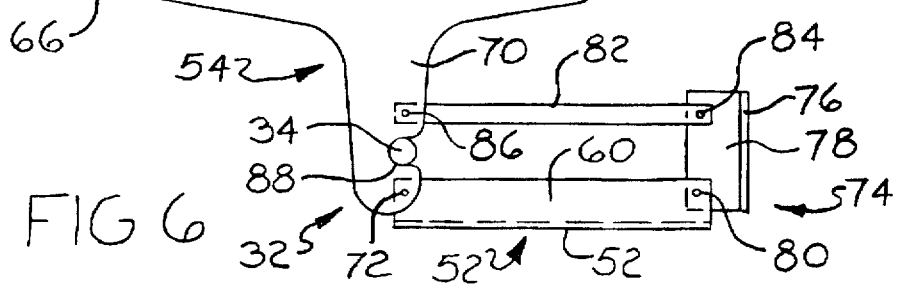
FIG. 6 is a simplified side view of the side support linkage of the present invention.

Referring now to FIG. 6, side support linkage 32 is substantially similar to center support linkage 30. Utilizing as many common components between center support linkage 30 and side support linkages 32, 32' reduces the number of unique parts for table assembly 24, thereby reducing the costs associated with manufacturing the present invention. Accordingly, like components are identified with like reference numerals and only differences therebetween will be further described. Similarly, right side support linkage 32' is identical to left side support linkage 32. Accordingly, only left side support linkages will be further described.

With continued reference to FIG. 6, side support linkage 32 includes side support bracket 76 having plate 78 with a plurality of apertures formed therethrough for securing side support bracket 32 to rear wall portion 18 with appropriate fasteners. A pair of flanges 78 extend forwardly from plate 76 for operably coupling side support bracket 32 with connection link 52 in a manner similar to that described with respect to center support linkage 30. Accordingly, connection link 52 is pivotally connected to a lower portion of side support bracket 74 at pivot 80. Side support linkage 32 further includes guide link 82 interconnected between an upper portion of side support bracket 74 and table bracket 54. More specifically, guide link 82 is a flat link having a first end pivotally connected to an upper portion of side support bracket 74 at pivot 84 and a second end pivotally connected to flange 70 at pivot 86. Flange 70 of table bracket 54 further includes relieved arcuate portion 88 formed therein. Torsion bar 34 is disposed within relief 88 and secured thereto by an appropriate means such as welding. In this manner, torsion bar 34 interconnects downwardly extending flange 70 of left and right side support linkages 32, 32'.

Referring now to FIGS. 2 and 3, operation of the table assembly of the present invention will now be described. In the first, elevated position, table support linkages 30, 32, 32' are substantially vertical to support table top 26 and provide a maximum clearance therebeneath. Latch pins 36 engage latch mechanism 38 for securely maintaining table assembly 24 in the first, elevated position. When it is desirable to lower table assembly 24, release handle 42 is pulled outwardly causing concurrent tension in release cable 40 which disengages latch mechanism 38 from latch pin 36. A minimal amount of force is applied forwardly to table top 26 for withdrawing latch pin 36 from latch mechanism 38. Once free from latch mechanism 38, table assembly 24 easily rotates downwardly and outwardly away from rear wall portion 18 of cab 10 from the first, elevated position to the second, lowered position. As table assembly 24 is so manipulated, table top 26 remains substantially parallel until it engages seat flanges 22 which provides a lower stop for table assembly 24, thereby defining the second, lowered position thereof. In this position, additional cushions and pillows may be disposed over table top 26, which in conjunction with bench seats 20 provide a flat, horizontal sleeping surface. To return table assembly 24 to the first elevated position, table top 26 is merely manipulated in the reverse order as described above such that latch pins 36 engage latch mechanism 38 for maintaining table assembly 24 in that position.

While it is apparent that the preferred embodiment of the present invention is well calculated to provide the advantages and features above stated, it will be appreciated that the invention is susceptible to modification, variation and change, without departing from the proper scope or fair meaning of the subjoined claims.

We claim:

1. A table assembly positionable between a first, elevated position and a second, lowered position, the table assembly comprising:

a table top; and a table support linkage assembly located beneath and supporting said table top in a substantially horizontal position during manipulation of said table top between the first, elevated position and the second, lowered position, said table support linkage assembly including:

a center support linkage assembly including a center support bracket secured to a vertical wall, a center table bracket secured to said table top, and a first connection link having a first end pivotally connected to said center support bracket and a second end pivotally connected to said center table bracket; and a first side support linkage assembly including a side support bracket secured to said vertical wall and which is spaced apart from and distinct from said center support bracket, a side table bracket secured to said table top, and which is spaced apart from and distinct from said center table bracket a second connection link having a first end pivotally connected to said side support bracket and a second end pivotally connected to said side table bracket, and a guide link having a first end pivotally connected to said side support bracket and a second end pivotally connected to said side table bracket.

2. The table assembly of claim 1, further comprising a latching mechanism interdisposed between said table assembly and said vertical wall for maintaining said table assembly in the first, elevated position.

3. The table assembly as set forth in claim 2, further comprising a release mechanism operatively coupled to said latching mechanism and extending forwardly to a forward portion of said table top for facilitating release of said latching mechanism.

4. The table assembly of claim 2 wherein said latching mechanism further comprises:

a latch pin extending from said side table bracket; and a latch mechanism located on said vertical wall and releasably engageable with said latch pin to maintain said table assembly in the first, elevated position.

5. The table assembly of claim 4 wherein said latching mechanism constrains vertical movement of said latch pin relative to said latch mechanism and further accommodates lateral movement of said latch pin relative to said latch mechanism.

6. The table assembly as set forth in claim 4 further comprising:

a release cable operably coupled at a first end to said latch mechanism for releasing said latch pin from said latch mechanism;

a release handle disposed on a second end of said release cable; and a release support bracket secured to a bottom portion of said table top and operably supporting said release cable and said release handle.

7. The table assembly as set forth in claim 6 wherein said release support bracket is secured to a forward portion of said table top for facilitating access to said release handle.

8. The table assembly of claim 1 wherein said first connection link and said second connection link are substantially vertically oriented when said table top is positioned in the first elevated position.

9. The table assembly of claim 1 wherein said side support bracket comprises a web portion secured to said table top and a flange portion extending downwardly from said web portion, said first end of said second connection link and said first end of said guide link being pivotally connected to said flange portion.

10. The table assembly of claim 9 wherein second connection link is pivotally connected to said flange portion at a lower pivot located on an end of said flange portion opposite said web portion, and said guide link is pivotally connected to said flange portion at an intermediate pivot located in between said web portion and said end.

11. The table assembly of claim 10 wherein said side support linkage assembly further comprises a generally U-shaped second connection link and a generally flat guide link, said second connection link and said guide link being pivotally connected to said side support bracket such that a portion of said guide link is disposed within said second connection link when said table top is positioned in the first, elevated position.

12. The table assembly of claim 1 wherein said first side support linkage assembly spaced laterally outboard of said center support linkage assembly and a second side support linkage assembly spaced laterally outboard of said center support linkage assembly on a side opposite said first side support linkage assembly.

13. A table assembly positionable between a first, elevated position and a second, lowered position, the table assembly comprising:

a table top; and a table support linkage assembly located beneath and supporting said table top in a substantially horizontal position during manipulation of said table top between the first, elevated position and the second, lowered position, said table support linkage assembly including:

a center support linkage assembly including a center support bracket secured to a vertical wall, a center table bracket secured to said table top, and a first connection link having a first end pivotally connected to said center support bracket ar a center pivot and a second end pivotally connected to said center table bracket;

a pair of side support linkage assemblies interconnected by a torsion bar, each of said pair of side support linkage assemblies spaced laterally outboard to and on opposite sides of said center support linkage asssembly and further including a side support bracket secured to said vertical wall, a side table bracket secured to said table top, a second connection link having a first end pivotally connected at to said side support bracket at a side pivot and a second end pivotally connected to said side support bracket, and a second end pivotally connected to said side table bracket.

14. The table assembly of claim 13 wherein each of said side pivots of each said side support linkage assemblies are located on a common axis of rotation, and said center pivot is offset from said common axis of rotation.

15. The table assembly of claim 13 wherein said first connection link and said second connection link are substantially vertically oriented when said table top is positioned in the first elevated position.

16. The table assembly of claim 13 wherein each of said side table brackets further comprise a web portion secured to said table top and a flange portion extending downwardly from said web portion, each of said first ends of said second connection links and each of said first ends of said guide links being pivotally connected to said flange portion.

17. The table assembly of claim 16 wherein said side pivot is located on an end of said flange portion opposite said web portion, and said guide link is pivotally connected to said flange portion at an intermediate pivot located in between said web portion and said end.

18. The table assembly of claim 17 wherein each of said pair of side support linkage assembly further comprises a generally U-shaped second connection link and a generally flat guide link, said second connection link and said guide link being pivotally connected to said side support bracket such that a portion of said guide link is disposed within said second connection link when said table top is positioned in the first, elevated position.

19. The table assembly of claim 13 further comprising a latching mechanism interdisposed between said table assembly and said vertical wall for maintaining said table assembly in the first, elevated position.

20. The table assembly of claim 19 wherein said latching mechanism further comprises:

a pair of latch pins, each of said pair of latch pins extending from each of said side table bracket; and a pair of latch mechanisms, each of said pair of latch mechanisms located on said vertical wall and releasably engageable with each of said pair of latch pins to maintain said table assembly in the first, elevated position.

21. The table assembly of claim 20 wherein said latching mechanism constrains vertical movement of said pair of latch pins relative to said pair of latch mechanisms and further accommodates lateral movement of said pair of latch pins relative to said pair of latch mechanisms.

22. The table assembly of claim 19 further comprising a release mechanism operatively coupled to said latching mechanism for facilitating release of said latch mechanism.

23. The table assembly of claim 20 further comprising a release mechanism including:

a release cable operably coupled at a first end to said pair of latch mechanisms for releasing said pair of latch pins from said pair of latch mechanisms;

a release handle disposed on a second end of said release cable; and a release support bracket secured to a bottom portion of said table top and operably supporting said release cable and said release handle.

24. The table assembly of claim 23 wherein said release support bracket is secured to a forward portion of said table top for facilitating access to said release handle.

* * * * *

UNITED STATES PATENT AND TRADEMARK OFFICE
CERTIFICATE OF CORRECTION

PATENT NO. : 5,727,478

DATED : March 17, 1998

INVENTOR(S) : Brian Rahn; George Corder; Walter Kemmer; David Piontek; Brett Schihl It is certified that error appears in the above-indentified patent and that said Letters Patent is hereby corrected as shown below:

Column 1, line 30, "expressed" should be -- expressly --.

Column 1, line 37, "an" should be -- art --.

Column 2, line 15, "showed" should be -- shown --.

Column 3, line 24, "accuratley" should be "accurately".

Column 4, line 64, delete "which is".

Column 4, line 66, delete "which is".

Column 5, line 66, after "assembly" insert -- is --.

Column 6, line 1, after "assembly" insert -- is --.

Column 6, line 16, "ar" should be -- at --.

Column 6, line 26, delete "at".

Column 6, line 28, after "side" insert table bracket, and a guide link having a fi end pivotally connected to said side--; delete "," after "bracket".

UNITED STATES PATENT AND TRADEMARK OFFICE
CERTIFICATE OF CORRECTION

PATENT NO. : 5,727,478
DATED : March 17, 1998
INVENTOR(S) : Brian Rahn; George Corder; Walter Kemmer; David Piontek; Brett Schihl It is certified that error appears in the above-indentified patent and that said Letters Patent is hereby corrected as shown below:

Column 6, line 67, after "mechanisms" insert -- being --.

Column 6, line 65, "bracket" should be -- brackets --.

Signed and Sealed this

Third Day of November, 1998

Attest:

BRUCE LEHMAN

Attesting Officer

Commissioner of Patents and Trademarks